Patented Feb. 4, 1936

2,030,009

UNITED STATES PATENT OFFICE 2,030,009

RED PIGMENTS

Ekbert Lederle, Ludwigshafen-on-the-Rhine, Germany

No Drawing. Application August 19, 1933, Serial No. 685,961. In Germany August 30, 1932

5 Claims. (Cl. 134—58)

The present invention relates to a new process of producing red chromium pigments.

I have found that red chromate pigments of excellent properties are obtained by precipitating mixed crystals of lead chromate, lead sulphate and at least 4 per cent of lead molybdate from aqueous solutions of soluble lead salts by the addition of such precipitating solutions (i. e. solutions containing sulphate, chromate and molybdate ions) as are strongly acid. The acidity of the said solutions is selected so that they contain at least 1 hydrogen ion per atom of lead to be precipitated. By this manner of working the yellow precipitate which first appears is converted very rapidly and quantitatively into a brilliant red colour while by the methods of precipitating hitherto employed, in which acid ammonium molybdate is the only acid constituent of the solution, part of the yellow precipitate is not converted into red, the shade of colour and the fastness to light thus being unfavourably influenced. The acids present in the precipitating solution displace the equilibrium between chromate and bichromate in favour of the latter.

As acid precipitants it is preferable to employ alkali metal bichromates and sulphuric or molybdic acids, but monochromates and sulphates may be used together with free mineral acids, such as sulphuric, hydrochloric or nitric acid. Organic acids such as acetic acid may be used also. It is preferably partly or wholly to neutralize the acid after the precipitation.

The precipitation may be carried out at ordinary or at elevated temperature.

Part of the lead content of the pigments may be replaced by barium and/or strontium and part of the molybdate by tungstate. The content in chromate may be varied in wide limits; usually it is not lower than 30 per cent. Suitable additions may be made, for example hydrate of alumina may be added to the precipitate or before the precipitation.

The lead chromate pigments obtainable in the said manner are distinguished by good stability to light and by a brilliant pure red colour such as has hitherto not yet been observed in inorganic pigments apart from the expensive cinnabar, which is not fast to light, and the expensive cadmium colours. Furthermore the pigments according to this invention have an extremely great covering power.

The following examples will further illustrate the nature of this invention but the invention is not restricted to these examples.

Example 1

34 kilograms of lead nitrate are dissolved in 1500 litres of water and precipitated at ordinary temperature within the course of from ½ to 1 hour by the addition of a solution consisting of 10.3 kilograms of potassium bichromate, 2 kilograms of concentrated sulphuric acid and 2 kilograms of acid ammonium molybdate in 1000 litres of water. The whole is then stirred for some time, preferably after neutralizing the acid by means of soda or alkali. After filtering and drying, a brilliant red pigment of great strength of colour and good fastness to light is obtained.

Example 2

46 kilograms of lead chloride are dissolved in 3500 litres of water and precipitated within the course of 1 hour by the addition of a solution of 13 kilograms of potassium bichromate, 5.6 kilograms of concentrated sulphuric acid, 3.2 kilograms of ammonium molybdate and 630 grams of 100 per cent nitric acid in 1500 litres of water, the temperature being kept at from 35° to 40° C. 11.5 kilograms of anhydrous sodium carbonate are added in order to neutralize the free hydrochloric and nitric acids. By filtering and drying 50 kilograms of a scarlet pigment is obtained.

Example 3

52.7 kilograms of lead nitrate are dissolved in 3000 litres of water and precipitated at from 18° to 20° C. by the addition of a solution of 18.3 kilograms of potassium bichromate, 3.15 kilograms of ammonium molybdate, 1.8 kilograms of concentrated sulphuric acid and 6.3 kilograms of 100 per cent nitric acid in 2000 litres of water. The mixture is neutralized by the addition of from 14 to 15 kilograms of sodium carbonate. By filtering and drying at 120 C. a bluish red pigment of excellent strength of colour is obtained.

If 3.3 kilograms of lead nitrate are replaced by 2.5 kilograms of barium chloride while working under otherwise the same conditions a pigment of somewhat more yellowish shade and of still higher strength of colour is obtained.

Example 4

45 kilograms of lead chloride are dissolved in 3000 litres of water. A solution of 16 kilograms of potassium bichromate, 3.15 kilograms of ammonium molybdate, 3.15 kilograms of concentrated sulphuric acid and 4 kilograms of a 80 per cent nitric acid in 2000 litres of water is added, whereby precipitation occurs. The precipitate formed is filtered off, washed and dried at from 100 to 120° C. A bright red pigment of excellent fastness to light is obtained.

Example 5

46 kilograms of lead chloride are dissolved in 3000 litres of water and precipitated by adding a solution of 17.2 kilograms of potassium monochromate, 3.2 kilograms of ammonium molybdate and 5.6 kilograms of concentrated sulphuric acid in 2000 litres of water. Then the mixture is nuetralized by the addition of 8 kilograms of anhydrous sodium carbonate and the precipitate is filtered and dried. A red pigment of great colouring strength and of extremely vivid shade is obtained.

The same product is obtained if instead of 17.2 kilograms of potassium monochromate and 5.6 kilograms of concentrated sulphuric acid the following reagents are used: 13 kilograms of potassium bichromate, 3.15 kilograms of sulphuric acid and 3.5 kilograms of potassium bisulphate.

Example 6

34 kilograms of lead nitrate are dissolved in 1500 litres of water and precipitated at ordinary temperature within the course of from ½ to 1 hour by the addition of a solution consisting of 10.3 kilograms of potassium bichromate, 1 kilogram of concentrated sulphuric acid, 0.63 kilogram of nitric acid (100 per cent strength), 2 kilograms of acid ammonium molybdate and 3.3 kilograms of sodium tungstate in 1000 litres of water. The whole is stirred for some time, if desired after neutralization by means of alkali. The precipitate is then filtered and dried and a brilliant red pigment of still better strength of colour than that obtained according to Example 1 results.

Example 7

46 kilograms of lead chloride are dissolved in 3500 litres of water and precipitated within the course of 1 hour by the addition of a solution of 13 kilograms of potassium bichromate, 5.6 kilograms of concentrated sulphuric acid, 3.2 kilograms of ammonium molybdate and 600 grams of glacial acetic acid in 1500 litres of water. The mixture is worked up as described in Example 2. A pigment of high colouring strength is obtained. Instead of lead chloride the equimolecular amount of lead acetate may be employed, the same result being obtained.

Example 8

A solution of 26.5 kilograms of lead acetate $(Pb(CH_3.CO_2)_2)$ and 5.3 kilograms of barium nitrate in 1500 litres of water is precipitated with a solution of 10.3 kilograms of potassium bichromate, 2.9 kilograms of anhydrous sodium sulphate, 2 kilograms of ammonium molybdate and 1.2 kilograms of glacial acetic acid in 1000 litres of water, the reaction conditions and the manner of working up being as described in Example 1. A yellowish red pigment of very great strength of colour is obtained.

What I claim is:—

1. The process of producing red pigments which comprises precipitating mixed crystals comprising normal lead chromate, normal lead sulphate and normal lead molybdate by adding to an aqueous solution containing a soluble lead salt a strongly acid aqueous solution containing sulphate, chromate and enough molybdate ions as to produce mixed crystals containing at least 4 per cent of lead molybdate.

2. The process of producing red pigments which comprises precipitating mixed crystals comprising normal lead chromate, normal lead sulphate and normal lead molybdate by adding to an aqueous solution containing a soluble lead salt an aqueous solution containing sulphate, chromate and enough molybdate ions as to produce mixed crystals containing at least 4 per cent of lead molybdate and containing furthermore at least one hydrogen ion per each atom of lead to be precipitated.

3. In the process as claimed in claim 1, using an aqueous solution which in addition to a soluble lead salt contains a soluble salt of a metal selected from the group consisting of barium and strontium.

4. In the process as claimed in claim 1, using a strongly acid solution which in addition to sulphate, chromate and molybdate ions contains tungstate ions.

5. In the process as claimed in claim 1, using an aqueous solution which in addition to a soluble lead salt contains a soluble salt of a metal selected from the group consisting of barium and strontium and adding thereto a strongly acid solution which in addition to sulphate, chromate and molybdate ions contains tungstate ions.

EKBERT LEDERLE.